Patented Dec. 2, 1924.

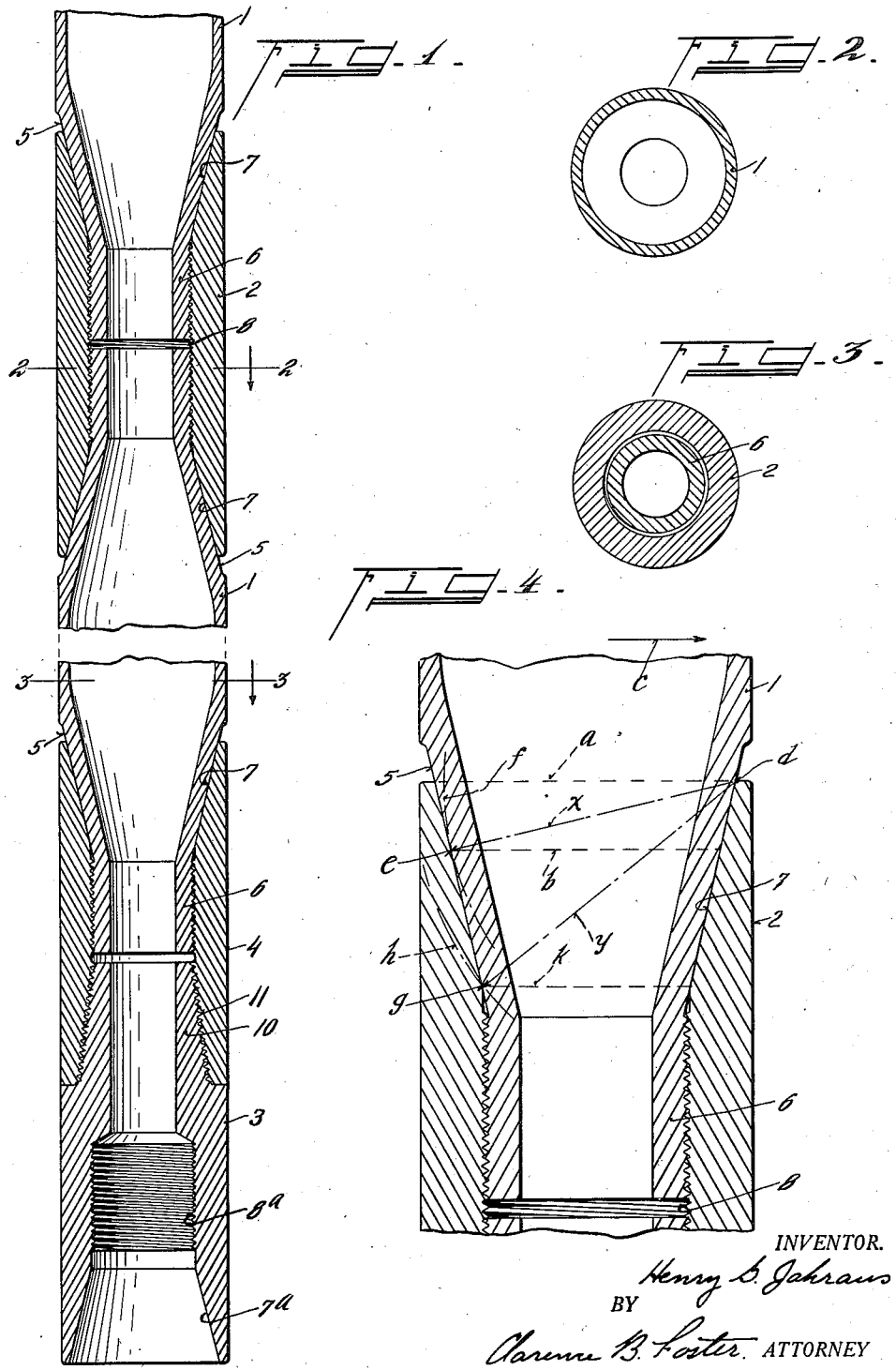

1,517,428

UNITED STATES PATENT OFFICE.

HENRY G. JAHRAUS, OF LOS ANGELES, CALIFORNIA, ASSIGNOR OF ONE-HALF TO WILLIAM R. MITCHELL, OF LOS ANGELES, CALIFORNIA.

ROTARY DRILL PIPE.

Application filed December 5, 1923. Serial No. 678,657.

*To all whom it may concern:*

Be it known that I, HENRY G. JAHRAUS, a citizen of the United States, residing at Los Angeles, in the county of Los Angeles and State of California, have invented a new and useful Rotary Drill Pipe, of which the following is a specification.

This invention relates to rotary drill-pipe and is particularly directed to an improved type of drill-pipe especially adaptable for use in drilling deep wells by the rotary system of drilling.

Drill-pipe of the character now in general use comprises lengths of pipe of uniform diameter threaded at both ends and joined by standard couplings and at every second or third length throughout the length of the drill-pipe string there is provided what is universally known as a "Hughes tool joint" and of the general character illustrated and described in United States Letters Patent #964,352, issued to M. H. Whittier, July, 12, 1910, the purposes and advantages of such tool-joints being so well known as to require no detailed description herein.

With such standard character of drill-pipe various disadvantages are encountered and accidents leading to expensive and tedious fishing jobs are of frequent occurrence, such fishing jobs being often due to a "twist-off" at the pipe threads and couplings. A "twist-off" of this nature may be due to one or more of several causes, among which may be mentioned, subjecting the pipe to a greater rotary strain than the pipe threads will withstand, bending strains occasioned by crooked holes, and relative vibration of the pipe lengths and couplings inducing a crystallization of the pipe ends. In the greater number of "twist-off," the break occurs at the last threads on the pipe and immediately adjacent the edge of a coupling, the pipe being weakened by the cutting of the threads.

With standard drill-pipe of uniform diameter the couplings are considerably greater in outside diameter than are the pipe lengths and as such drill-pipe must operate within well casing containing mud-water in circulation it follows that the outside diameter of such couplings must be considerably smaller than the inside diameter of the casing to allow sufficient clearance for a free circulation of the mud-water. In deep well drilling it is considered good practice to run four inch drill-pipe having couplings of 5.256 inches outside diameter in no smaller than 8¼ inch 40 pound casing of 7.825 inches inside diameter.

Heretofore, in running the ordinary type of drill-pipe in an open hole, the couplings break through the mud wall and where this occurs in sand or other soft stratas the sand is very liable to run into the hole and cause large cavities leading to a crooked hole and much difficulty in subsequently inserting a casing.

Therefore, it would be desirable to produce a drill-pipe having couplings of the same outside diameter as the drill-pipe sections, permitting a larger size drill pipe to be run in a given size of casing, that is, to permit a four inch drill-pipe to be run in a smaller than 8¼ inch 40 pound casing. A drill-pipe of this character would be especially advantageous by reason of the ease with which it could be lowered or pulled and would eliminate much of the danger of becoming "frozen" in the well bore, such freezing being in large measure due to the standard couplings scraping the mud from the walls of the well bore.

It is therefore an object of the present invention to provide an improved type of drill-pipe in which relative vibration of the component parts is eliminated.

A further object is to provide a drill-pipe comprising a plurality of pipe sections joined in a manner to withstand a greater rotary strain than standard threaded pipe and couplings.

Another object is to form the couplings and pipe ends so as to provide greater stability against bending strains.

Another object is to provide a drill-pipe composed of pipe sections and connecting couplings all of uniform outside diameter.

A further object is to provide a drill-pipe composed of threaded pipe sections and threaded connecting couplings having co-engaging tapered surfaces relieving the threads of a major portion of the rotary strains.

A still further object is to provide a drill-pipe of the above character, which has a greater resistance against bending, twisting, and longitudinal strains, than standard threaded pipe and couplings, and in which crystallization of the component parts has been reduced to a minimum.

Another object is to provide a drill-pipe of the above character, including one or more tool-joints and in which the adjacent pipe sections are connected to the respective pin and box members of the tool-joint in the same manner as the pipe sections are connected to the pipe couplings.

Various other objects and advantages will be more fully apparent from the following description of the accompanying drawings which form a part of this disclosure, and which illustrate a preferred form of embodiment of the invention.

Of the drawings:

Fig. 1 is a longitudinal section through a portion of a drill-pipe string.

Fig. 2 is a section on line 2—2 of Fig. 1, and Fig. 3 is a section on line 3—3 of Fig. 1.

Fig. 4 is a semi-diagrammatic section showing the tapered portions of a pipe end and the couplings.

Referring to the drawings, 1 designates pipe sections joined together by couplings 2, and 3, 4 designates the pin and box members respectively of a tool-joint which may be inserted between the pipe sections at desired intervals throughout the length of the drill-pipe line.

It will be noted that the pipe sections 1 have their ends reduced in diameter and formed to provide smooth tapered or cone portions 5 terminating with externally screw-threaded end portions 6.

Preferably the pipe section ends are upset to secure greater wall thickness so as to provide an exceptionally strong and durable construction, this being accomplished without reducing the internal bore to a diameter smaller than the bore of standard drill collars used in connection with rotary drill-pipe.

By so reducing the diameter of the ends of the pipe sections it becomes possible to make the coupling 2 no greater in diameter than the normal diameter of the pipe sections and at the same time to make the coupling of sufficient wall thickness to withstand all strains to which it may be subjected.

The bore of the coupling 2 is formed to correspond with the ends of the pipe sections, that is, said bore is tapered inwardly from its ends to provide cone sockets 7 to receive the respective tapered or cone portions 5 of adjacent pipe sections, and is internally screw-threaded at 8 between the tapered portions to receive the externally screw-threaded end portions of the respective pipe ends, the screw-threaded portions being straight, or at least of such character as to allow the tapered portions to tightly coengage before the threaded portions bind to prevent such coengagement.

With this construction the screw-threaded portions exert a longitudinal pull drawing the tapered cone ends of the pipe sections into the tapered cone sockets of the couplings, the coengaging tapered surfaces functioning much in the same manner as those of a taper-shank twist drill or tapered lathe-centers and taking a major portion of the rotary or twisting strains, leaving the screw-threaded portions a main function of exerting a longitudinal pull maintaining the tapered surfaces tightly engaged.

While tapered cone and socket surfaces of any appreciable length will more or less resist rotary or twisting strains it will be obvious that in a drill-pipe for drilling deep wells, the degree of taper should more nearly approach that used on heavy duty twist drills and lathe centers, while at the same time such taper should be such as to permit a disconnection of the pipe sections with the power available with standard rotary drill rigs, and while the degree of taper illustrated is believed to be thoroughly practical, that to be used in actual practice will be determined more or less by experience under various conditions.

Further as the tapered cones and sockets also serve the purpose of strengthening the connection against bending strains, it will be stated that the length of such tapered cones and sockets in relation to the angle of the taper and their diameter is of importance. With reference to Fig. 4 and considering only the tapered portions (disregarding the threaded portions) it will be pointed out that if the tapered surfaces extended only from line $a$ of greatest circumference to the line $b$ and with the coupling stationary and a bending force applied to the pipe section in the direction of the arrow $c$, said section pivoting at point $d$ on the larger circumference of the taper of the coupling would tend to swing point $e$ along the arc $f$ which does not intersect the wall of the coupling, therefore in such instance the tapered portions of the pipe section and coupling would offer no resistance to such bending action and would place the entire burden upon the threaded portions.

In the present invention the tapered portions are of a length to bring their lower ends considerably outside of the arc $f$ so that with any bending strains tending to rock the pipe section about the point $d$, or any similar point on the major circumference of the coupling taper, the line of force exerted by the point $g$, or any similar point on the minor circumference of the taper of the pipe section, along the arc $h$, will intersect and be resisted by the wall of the coupling. In describing this it may be said that the taper of the coupling is so formed that the distance $x$ from a given point $d$ on its larger circumference $a$ to the nearest diametrically opposite portion $e$ is less than the distance $y$ from said point *d* to a given point *g* on the smaller circumference *k* of said taper.

The tool-joint incorporated in a drill-pipe line of this character comprises the pin section 3 having the usual tapered externally screw-threaded pin 10, and the box section 4 having the usual tapered internally screw-threaded box 11 to receive the pin. The opposite ends of both the pin and the box sections have the tapered and screw-threaded bores corresponding in every particular with those in the couplings 2 and providing the tapered sockets 7ª and straight screw-threaded portions 8ª into which the ends of pipe sections may be screwed.

While the couplings and the tool-joint members illustrated in the drawings are of approximately the same external diameter as are the pipe sections, (this being done only to show how these diameters may be reduced if so desired, it is recognized that in ordinary oil field practice and using the more or less standard types of elevators, it is desirable that the tool-joint members and in some cases also the couplings, be slightly larger in diameter than the pipe sections so as to provide a shoulder for engagement by the elevators, therefore, it is to be understood that the tool-joint members and couplings herein may be slightly increased in diameter for this purpose, without departing from the spirit of the invention which in its major aspect relates to the type of joint or connection employed.

The above described construction provides a drill-pipe line of exceptional strength and durability and which has many advantages in deep well drilling, over the type now in general use, and while the specific form of embodiment herein illustrated and described is well adapted to fulfill the objects primarily stated, it is to be understood that I do not wish to limit the invention in this regard, for it is susceptible of embodiment in various other forms all coming within the scope of the following claims.

I claim:

1. A rotary drill-pipe including a member having a bore tapered inwardly from its outer end and having an internally screw-threaded portion beyond the taper, said tapered bore being formed so that the distance from a given point on its larger circumference to the nearest diametrically opposite portion of its tapered surface is less than the distance from said point to a diametrically opposite point on the smaller circumference of the taper, and an adjacent member formed to provide a tapered portion terminating with an externally screw-threaded end portion, the tapered and threaded portions of said adjacent member corresponding with and adapted to engage within the like portions of the first named member.

2. In a rotary drill-pipe, a coupling having a bore tapered inwardly from its outer end and having a straight internally screw-threaded portion beyond the taper, said tapered bore being formed so that the distance from a given point on its larger circumference to the nearest diametrically opposite portion of its tapered surface is less than the distance from said point to a diametrically opposite point on the smaller circumference of the taper, and a pipe section having an end reduced in diameter and formed to provide a smooth tapered portion terminating with a straight externally screw-threaded end portion of lesser diameter than the normal diameter of the pipe section, the tapered and threaded portion of the pipe section corresponding with and adapted to engage within the like portions of the coupling bore.

3. A rotary drill-pipe including a plurality of pipe sections and an intermediate connecting coupling, the end of each pipe section being reduced in diameter and formed to provide a smooth tapered portion terminating with a straight externally screw-threaded end portion of lesser diameter than the normal diameter of the section, and the coupling having a bore tapered inwardly from its opposite ends and internally screw-threaded between the tapered portions with the tapered and threaded portions of the coupling bore corresponding to those of the pipe sections, whereby said sections may be screwed into the respective ends of the bore to engage the co-operating tapered surfaces.

4. A rotary drill-pipe including a coupling having a bore tapered inwardly from its opposite ends and internally screw-threaded between the tapered portions, each tapered portion being formed so that the distance from a given point on its larger circumference to the nearest diametrically opposite portion of its tapered surface is less than the distance from said point to a diametrically opposite point on the smaller circumference of the taper, and pipe sections each having an end reduced in diameter and formed to provide a smooth tapered portion terminating with a straight externally screw-threaded end portion of lesser diameter than the normal diameter of said section, the tapered and threaded portions of the pipe sections corresponding with those of the coupling whereby said sections may be screwed into the respective ends of the bore to engage the co-operating tapered surfaces.

5. In a rotary drill-pipe, a plurality of pipe sections each having an end reduced in diameter and formed to provide a smooth tapered portion terminating with a straight externally screw-threaded end portion, and a tool joint comprising a tubular box member having a tapered internally screw-threaded socket at one end and a tubular pin member having a tapered externally screw-threaded pin at one end adapted to engage within the threaded box of the box member, the opposite ends of the box and the pin members each having their bores tapered inwardly and internally screw-threaded beyond said tapered portions to correspond to the tapered and screw-threaded ends of the pipe sections, whereby, the pipe sections may be screwed into the respective tool-joint members to engage the co-operating tapered surfaces and the tool-joint tapered screw-threaded pin may be screwed into the tool-joint tapered screw-threaded box.

6. In a rotary drill-pipe, a pipe section having an end upset to provide a wall of increased thickness and reduced in diameter to form a smooth tapered portion terminating with a straight externally screw-threaded end portion of lesser diameter than the normal diameter of the section, and a coupling having a bore tapered inwardly from its outer end and internally screw-threaded beyond the taper to accommodate the tapered and threaded end of the pipe section.

7. A rotary drill-pipe connection comprising a tubular box member having a screw-threaded socket at one end, and a tubular pin member having a screw-threaded pin at one end adapted to engage within the socket of the box member, the opposite ends of the box and pin members each having their respective bore tapered inwardly and internally screw-threaded beyond said tapered portion, the tapered portion of the bore of each member being formed so that the distance from a given point on its larger circumference to the nearest diametrically opposite portion of its tapered surface is less than the distance from said point to a diametrically opposite point on the smaller circonference of the taper.

Signed at Los Angeles, California, this 24th day of November, 1923.

HENRY G. JAHRAUS.